Oct. 22, 1968

C. W. HANSEN 3,407,300

COLLIMATOR AND METHOD OF MAKING SAME

Filed April 14, 1966

INVENTOR
CARL W. HANSEN by Watts & Fisher, Attys.

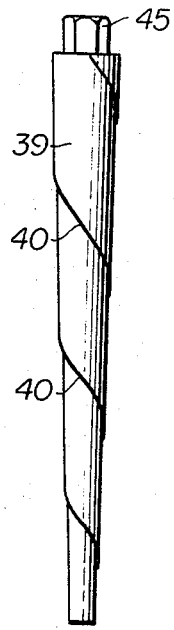
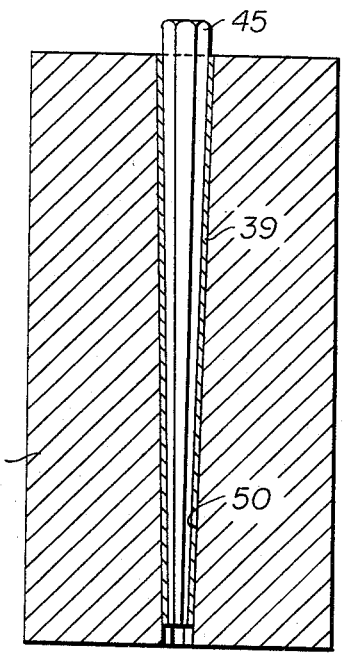
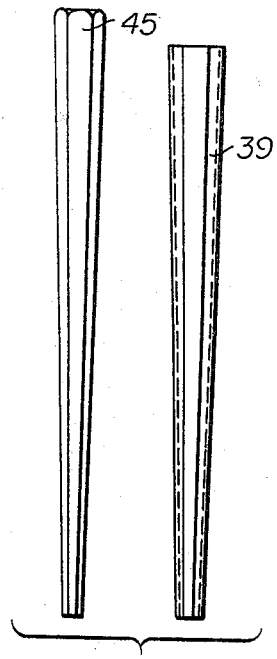
Fig. 5   Fig. 6   Fig. 7
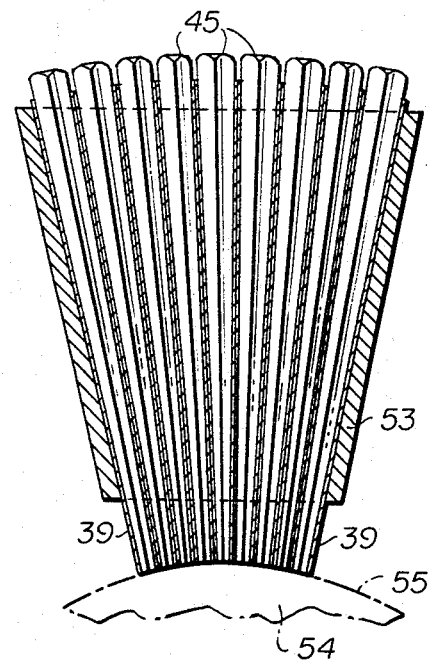
Fig. 8
INVENTOR
CARL W. HANSEN
by Watts & Fisher, Attys.

United States Patent Office 3,407,300
Patented Oct. 22, 1968

3,407,300
COLLIMATOR AND METHOD OF MAKING SAME
Carl W. Hansen, Chagrin Falls, Ohio, assignor, by mesne assignments, to Picker Corporation, White Plains, N.Y., a corporation of New York
Filed Apr. 14, 1966, Ser. No. 542,568
15 Claims. (Cl. 250—105)

ABSTRACT OF THE DISCLOSURE

Thin sheets of lead foil are each bonded to themselves as they are wrapped around mandrels. The wrapped mandrels are arranged in a matrix in a body bore. The space between the matrix and the body is suitably filled to bond the matrix in place. The mandrels are then removed to produce the disclosed collimator which has tapered passages of hexagonal configuration.

---

This invention relates to scintillation detectors and more particularly to a novel and improved collimating cone to be used in combination with a scintillation detector.

The use of radioactive isotopes in a variety of medical diagnostic techniques is now widely accepted. With many of these techniques, a selected isotope is administered to the patient. A study is then made of the distribution and concentration of the isotope in the patient. This type of study is of benefit in diagnosing tumors, cancerous conditions, and other physical problems.

The most commonly used technique for measuring the distribution and intensity of the administered isotope in a patient is with a device known as a scintillation scanner. One such scanner is described and claimed in United States Patent Re. 26,014, issued May 3, 1966 to J. B. Stickney et al. under the title "Scintillation Scanner." With the device described in that patent, the patient is positioned below a scintillation probe. The probe is then reciprocated along a series of parallel paths over the patient. Energy detected by the probe is selectively conducted to a suitable recording device such as either so-called photorecording device or a dot recording device such as the type which uses Teledeltos paper. The electrical circuitry used to conduct a signal from the probe to the recording device is disclosed in greater detail in U.S. Patent No. 3,159,744, issued Dec. 1, 1964, to J. B. Stickney et al. under the title "Scintillation Scanner Photo-Circuit."

With the circuit described in the "Photo-Recording Circuit" patent, whenever a predetermined level of intensity is reached, a signal is sent to the recording mechanism. With the photorecording device taught in this referenced patent, each photorecorded dot is proportional in intensity to the activity detected.

The circuit and mechanism of these referenced patents produce graphic images of the distribution of the radioactive energy in the patient. Each graphic image is composed of dots which vary with intensity and concentration according to the activity detected so that the physician is able to determine not only the area in which the activity is present but its distribution and concentration.

In relatively recent years, so-called low energy isotopes have been developed. As used here, a low-energy isotope is considered to be one whose emitted energy is below 150 kev. While these low energy isotopes are highly desirable for certain types of studies, they have caused some difficulty in that a collimating device positioned between the patient and the scintillation probe must be constructed differently than collimation devices for high-energy isotopes if the best and most satisfactory results are to be obtained.

Collimators used with scintillation probes have a plurality of divergent holes. With all collimators, the objective is to have the walls defining these divergent holes as thin as possible so that a maximum amount of energy is conducted to the scintillation probe. At the same time the walls obviously must be of adequate thickness to absorb the energy encountered. Ideally, the walls should be of tapering thickness being their thinnest at the end adjacent the probe.

With low-energy isotopes, wall thickness can be reduced to the point where conventional casting techniques are not satisfactory for making lead collimators. Accordingly, if the most efficient collimator is to be utilized, conventional techniques of collimator formation are not suitable.

The present invention is directed to a novel and improved technique which is the first commercially acceptable technique for making optomized collimators for low-energy isotopes. It is a technique which utilizes a minimum of tooling and yet provides a great deal of flexibility so that with a minimum investment a full line of optomized collimators of various sizes can be provided.

According to the preferred form of the invention thin pieces of lead foil are each die cut to a desired shape. The desired shape is one in which the transverse dimension of the foil at the end which will be the input end is less than the transverse dimension of the foil at what will become the output end of the collimator. These foil pieces are then individually wrapped around tapered mandrels and each mandrel is driven into a tapered die hole to assure tight, close juxtaposition of the lead foil about the mandrel and to swedge the foil into its preferred and proper cross-sectional configuration.

A suitable bonding agent is applied to the exterior of each of the wrapped pieces of foil and then a group of mandrels, each with foil wrapped around it, is placed in an appropriate bonding jig. The mandrels are preferably hexagonal in cross section so that the maximum number of them can be nested in a given jig with uniform amounts of lead between any two adjacent mandrels. The mandrels and foil are maintained in the jig until the bonding agent has been set or cured. The bonded lead and the mandrels are then removed as a unit from the jig and inserted in a tapered opening in a lead body. A suitable filling and bonding agent is poured around the inserted unit to secure the unit to the body. After the filling and bonding agent has been cured, the mandrels are removed, the faces of the cone machined, and the collimator has been completed.

Accordingly, the objects of this invention are to provide a novel and improved method of making collimators and an improved collimator.

Other objects and a fuller understanding of the invention may be had by referring to the following description and claims taken in conjunction with the accompanying drawings in which:

FIGURE 5 is an elevational view of a wrapped mandrel;

FIGURE 6 shows the foil wrapped on the mandrel and inserted in a die to form the tapered lead foil insert;

FIGURE 7 is an exploded view showing a mandrel and a formed swedged lead foil insert in elevation; and, FIGURE 8 shows a plurality of the mandrels and inserts in a jig for bonding of the lead inserts together.

Figure 1:
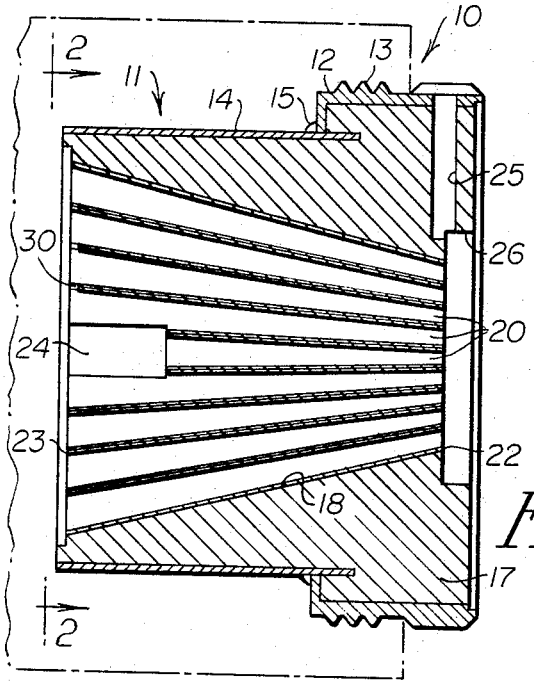
FIGURE 1 is a sectional view of the novel and improved collimator as seen from the plane indicated by the line 1—1 of FIGURE 2.

Referring now to FIGURE 1, a portion of a scintillation probe is shown in phantom at 10. The collimator of this invention is shown generally at 11 positioned adjacent the input end of the probe 10. The collimator 11 includes a mounting ring 12 with a threaded portion at 13 for securing the collimator to the probe 10. A sleeve 14 is provided. The sleeve 14 is brazed to the mounting ring 12 at 15 so that the sleeve and ring together provide a skin or housing for the collimator. A cast lead body 17 is within this sleeve or housing. The body 17 includes a conical through passage 18.

Figure 2:
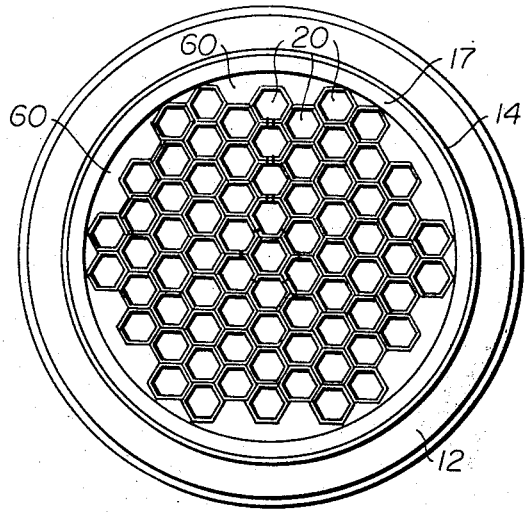
FIGURE 2 is an end view as seen from the plane indicated by the line 2—2 of FIGURE 1.

A plurality of lead members defining tapered collimating passages 20 are positioned in the conical hole 18. As an examination of FIGURE 2 will show, each of these collimating passages 20 is hexagonal in cross sectional configuration. These passages 20 taper outwardly from an inlet end at 22 to an outlet end at 23.

An axial bore 24 is provided adjacent the output end. The axial bore is provided to receive a light bulb which emits a beam of light used for centering the cone at the time a study is being set up.

A radially disposed bore is provided at 25 near the input end of the collimator. The bore 25 extends from the perimeter of the sleeve 12 to a concentric recess 26 formed at the input end of the collimator. A wire, not shown, is fed through the bore 25 into the recess 26. The wire then extends rearwardly through the outer one 27 of the passages 20. At the output end of the collimator the wire extends radially inwardly and in milled slot 30 to the lightbulb bore 24 for providing energy to a lightbulb in the bore.

The walls which define each of the passages 20 should be of slightly tapering thickness with the wall thickness gradually decreasing from the input to the output end of the collimator. Due to the relatively small scale of the drawings, this taper is not shown. The novel and improved method for forming such walls is best understood by reference to FIGURES 3-5.

Figure 3:
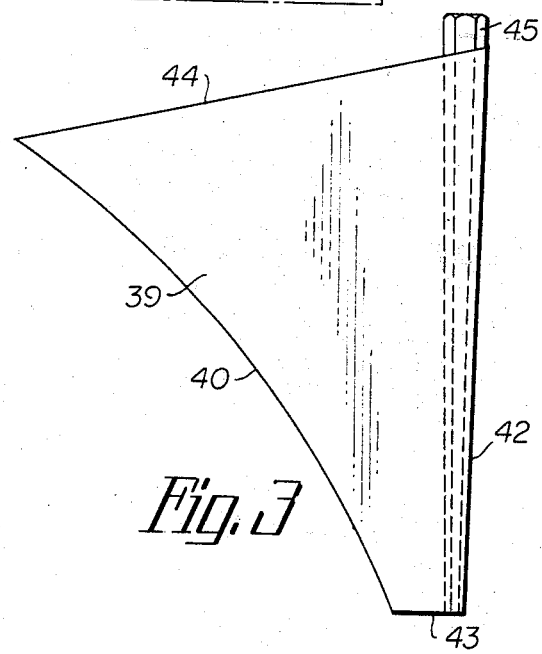
FIGURE 3 is a plan view of a die cut piece of lead foil and a mandrel as wrapping of the foil on the mandrel is about to commence.

Referring to FIGURE 3, a plurality of lead foil wall members 39 are first die cut to the contour shown in FIGURE 3. The contour is generally that of a trapezium with the exception that edge 40 which will form the outer seam when the foil is wrapped, is slightly curved. A wall member 39 as shown in FIGURE 3 may typically, for a four-inch collimator, have a long side 42 which is four and one-quarter inches in length. Base edge 43 which will form the input end of the wall may be half an inch in length. Top edge 44 is at an angle of 13½ degrees from the horizontal so that after swedging and trimming the wall thickness will have the desired taper. With the illustrative dimensions, a radius of 9⅝ inches for the curved side 40 will produce the desired lead distribution after the foil has been wrapped on the mandrel.

Figure 4:
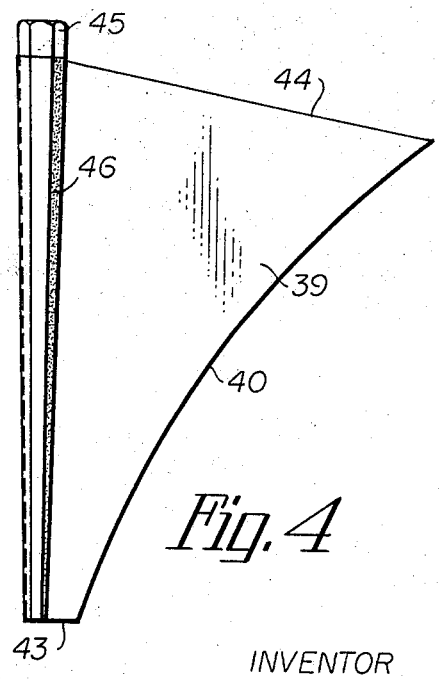
FIGURE 4 shows a mandrel and a piece of lead foil after one wrap has been made.

As a wall is formed, the foil is tightly wrapped once around the mandrel, FIGURE 4. A quantity of suitable adhesive 46 is then applied to the foil. A suitable adhesive is that sold commercially under the trademark Loctite Low Bake Adhesive 302 by Loctite Corporation, Newington, Conn. The remainder of the foil is then tightly and smoothly wrapped around the mandrel while the bottom edge 43 is maintained flush with the bottom of the mandrel so that at least two complete wraps of .004 inch lead foil are provided on all parts of the mandrel. As an examination of FIGURE 5 will show, the slight taper of the top edge 44 compensates for the taper of the mandrel so that the top of the wrapped piece is substantially even.

The mandrel is then driven into a tapered hexagonal hole 50 in a suitable die 51, FIGURE 6. This forces the lead foil tight and flat about the mandrel and swedges and distributes the lead to make the walls of substantially uniform thickness in any plane of cross section but of the desired tapering thickness from the input to the output end of the collimator.

The mandrel with the foil on it is then removed from the die as a unit. In FIGURE 7 the wall member 39 and the mandrel 45 are shown in an exploded view for clarity of illustration. In the preferred mode of practicing the invention, the mandrel and wall member are not separated at this stage of the process.

Next the large, or output, end of the wall member 39 is trimmed to make it even. The wall and mandrel are inserted in a 95 degree centigrade oven for ten minutes to cure the bonding material.

After the desired number of pieces of lead foil have been wrapped on a like number of mandrels, and the adhesive has been cured, each of the foil wall members 39 is coated with a suitable adhesive. Typically, this material may be an epoxy resin adhesive sold by Minnesota Mining and Mfg. Co. under the trademark Scotchcast No. 3 Epoxy.

A plurality of the mandrels and epoxy-coated wall members 39 are then assembled into a matrix and inserted in a jig fixture 53, FIGURE 8. The ends of the mandrel may be brought into abutment with a suitable fixture 54 so that all are properly aligned. The fixture is preferably spherical in contour as indicated at 55 in FIGURE 5.

This spherical fixture coacting with the jig 53 provides the appropriate hole geometry in the finished construction. With this geometry the axes of the holes 20 intersect at a point which is the center of the sphere 55. Thus, the axes are radii of the sphere. With this hole geometry, the more central mandrels are positioned such that the collimating passages at the center are of smaller cross section at the inlet end then are those at the perimeter of the inlet end. This difference in hole size is slight and because of the scale, is difficult to discern in the drawings.

By positioning the mandrels against the surface 55 which is a segment of the sphere, the mandrels are each oriented such that, as noted above, their axes converge on a point which is the center of curvature of the spherical portion 55. The center of the sphere is approximately the same distance from the probe as the source of activity will be when the device is in use. Thus, the holes, in effect, radiate from this imaginary point upon which the collimator is focussed when in use.

After the mandrels and wrapped foil have been inserted in the fixture 53 they are cured one hour at 100 to 105 degree centigrade. The entire assembly is then removed from the fixture 53 as a unit and inserted in the conical hole 18 in the body 17.

A mixture of a suitable shielding material such as tungsten powder bonded together with a suitable agent such as Scotchcast No. 3 Epoxy, mentioned above, is then poured around that matrix to fill the space between the matrix and the body 17. Alternately, the mixture may be a slurry of lead or lead and tungsten powder and a suitable bonding agent. Portions of this mixture are designated by the numeral 60 in FIGURE 2. The mandrels and matrix are then clamped in the body 17, any remaining voids are filled with the tungsten-epoxy mixture, and the mixture is oven cured for one hour at 100-105 degrees centigrade. After the finished device has been allowed to cool, the mandrels are removed from the assembly.

After the mandrels have been removed and the assembly is cured, the matrix is filled with a suitable material such as that sold commercially by Standard Oil Co. (Ohio) under the trademark Parowax. This is a paraffin-base wax material which is solid at room temperature and is used to reinforce the thin wall members. The input and output ends of the collimator are then machined to provide the recess 26, the facing of the output end of the collimator 23, the light bore 24 and the slot 30.

After machining the wax is removed from the collimator by placing it in the heated oven. The collimator is then degreased with a suitable degreasing agent and the collimator has been completed.

It will be seen that since all of the mandrels have been positioned so that they in effect lie along a radius emanating from an imaginary point, and the input and output ends of the collimator have been machined flat in planes which are tangent to a circle around that imaginary point, the cross sectional area of the passages, as noted above, increases from the center outwardly. Nonetheless, each passage is symmetrical about a radius from this point so that efficient collimation with uniformly tapering walls defining each of the collimating passages 20 is obtained.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. The method of forming a collimator comprising:
    (a) wrapping each of a plurality of pieces of thin foil-like material around a different mandrel, the material being capable of absorbing radiation from a radioactive isotope;
    (b) fixing the pieces of wrapped foil-like material together in a matrix;
    (c) inserting the matrix in a bore in a body;
    (d) securing the matrix and body together by filling the space between the matrix and the body; and,
    (e) removing the mandrels from the pieces.
2. The method of claim 1 wherein the mandrels and bore are tapered and the pieces are thin lead foil and including the step of cutting each of said pieces of thin lead foil to a generally trapezoidal shape.
3. The method of claim 1 including the step of bonding each of said pieces to itself as it is wrapped on its mandrel.
4. The method of claim 3 including the step of heat curing an adhesive bonding the foil pieces to themselves.
5. The method of claim 1 wherein each of said mandrels is tapered including the step of inserting a plurality of said wrapped mandrels in a jig of generally conical configuration and positioning one end of each mandrel against a locating surface.
6. The method of claim 5 wherein the locating surface is substantially a segment of a sphere.
7. The method of claim 1 including the steps of applying an adhesive to said pieces to bond them to one another and heat curing the adhesive.
8. The method of claim 1 wherein the space between the matrix and the body is filled with a radiation-absorbent material.
9. The method of claim 8 wherein the radiation-absorbent material is a slurry of tungsten and a bonding agent.
10. The method of claim 8 wherein the radiation-absorbent material is a slurry of lead and a bonding agent.
11. The method of forming a collimator comprising:
    (a) cutting lead foil into a group of pieces of generally trapezoidal configuration, having a short base, a long side generally normal to the base, a top edge in non-parallel relationship with the base, and an outer generally curved edge;
    (b) wrapping each piece on a tapered, hexagonal mandrel, long side first;
    (c) applying an adhesive to the piece to bond it to itself after one turn has been made on the mandrel and thereafter continuing the wrapping until at least two turns of lead are around the mandrel at substantially all points, top to bottom;
    (d) inserting each wrapped piece and the mandrel in a tapered die hole and swedging the piece by impaling the mandrel;
    (e) removing the mandrel and the lead from the die;
    (f) trimming the lead to provide even top and bottom ends of the wrapped and swedged piece;
    (g) applying adhesive to the exteriors of the pieces and inserting a plurality of the pieces and mandrels in a tapered jig and positioning each mandrel against a locating surface;
    (h) curing the adhesive on the pieces to bond the pieces together into a matrix;
    (i) removing the mandrels and the matrix from the jig and inserting them in a tapered opening in a body with the mandrels extending from both ends of the body;
    (j) filling the space between the matrix and the body with a radiation-absorbent material;
    (k) removing the mandrels from the matrix;
    (l) filling the spaces in the pieces with a wax material which is solid at room temperature; and,
    (m) machining the ends of the body and matrix while the matrix is filled with said wax, and removing the wax.
12. The method of claim 11 wherein the radiation-absorbent material is a mixture of an X-ray absorbent metal powder and a bonding agent.
13. A collimator for a scintillation scanner or the like comprising:
    (a) a body having a through passage extending from an inlet to an outlet;
    (b) a plurality of wall members each formed of a wrapped foil-like material and each defining a through collimating passage, the material being capable of absorbing radiation from a radioactive isotope;
    (c) said wall members being positioned in said body passage with each collimating passage transverse to the planes of the inlet and outlet; and
    (d) means securing the wall members in the body.
14. The device of claim 13 wherein the wall members are of tapering thickness and each collimating passage is tapering.
15. The device of claim 14 wherein the wall thickness and collimating passages taper in the same direction.

References Cited

UNITED STATES PATENTS 2,942,109    6/1960    Bell et al. _____ 250—71.5

FOREIGN PATENTS 1,051,495    1/1954    France.

WILLIAM F. LINDQUIST, *Primary Examiner.*